(No Model.)
W. S. OVERFELT, J. R. EVANS & C. J. CAPP.
DEVICE FOR SUPPORTING VEHICLES.
No. 486,790. Patented Nov. 22, 1892.
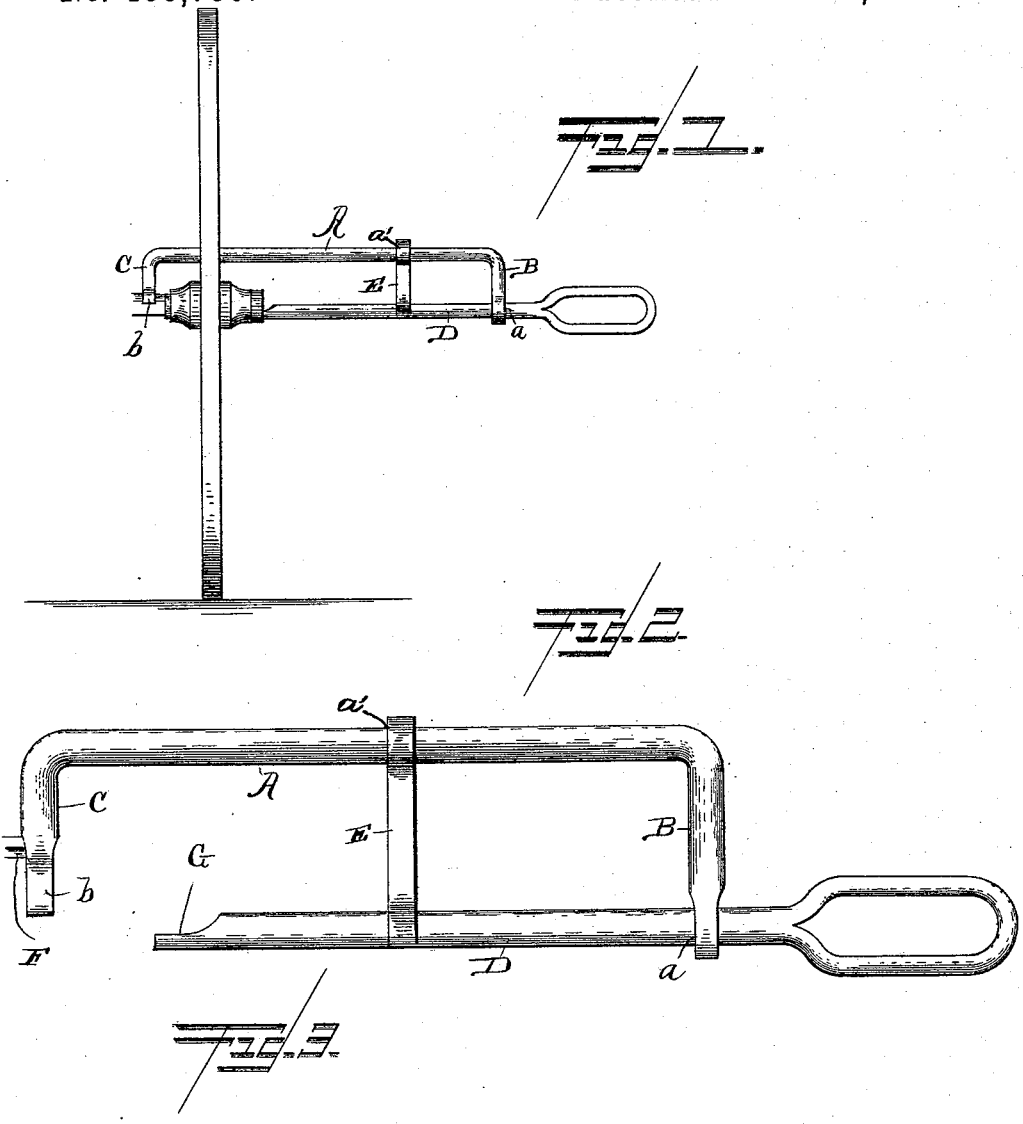
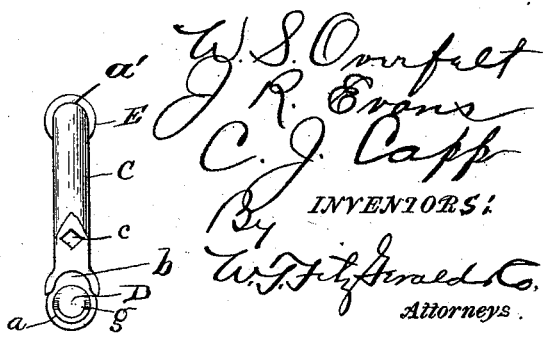
WITNESSES

UNITED STATES PATENT OFFICE.

WILLIAM S. OVERFELT, JOHN R. EVANS, AND CHARLES J. CAPP, OF DUNCAN'S BRIDGE, MISSOURI.

DEVICE FOR SUPPORTING VEHICLES.

SPECIFICATION forming part of Letters Patent No. 486,790, dated November 22, 1892.

Application filed March 10, 1892. Serial No. 424,460. (No model.)

*To all whom it may concern:*

Be it known that we, WILLIAM S. OVERFELT, JOHN R. EVANS, and CHARLES J. CAPP, citizens of the United States, residing at Duncan's Bridge, in the county of Monroe and State of Missouri, have invented certain new and useful Improvements in Devices for Supporting Vehicles; and we do hereby declare the following to be a full, clear, and exact description of the invention, such as will enable others skilled in the art to which it appertains to make and use the same.

Our invention has relation to an improved implement for removing the nut from the spindle of an axle and for supporting a wheel in its upright position after the same has been removed from the axle-spindle, and its novelty will be fully understood from the following description and claim when taken in conjunction with the annexed drawings, in which—

Figure 1 is a view illustrating our improved implement in use. Fig. 2 is an enlarged view of the implement, and Fig. 3 is an elevation of the inner end of the same with the nut-wrench removed.

Referring by letter to the said drawings, A indicates the main bar of our improved implement, which is provided at its ends with angular branches B C, which may be formed integral with or suitably connected to said bar. Taking loosely through an eye a, formed in the angular branch B of the main bar, is the slide-bar D, which is provided at an intermediate point in its length with a preferably-integral hanger branch E, which is provided at its end with an eye a' to receive the main bar A, upon which it slides, for a purpose presently described. The side of the slide-bar D is cut away at its inner end at G and is provided with transversely-disposed threads g, as shown, which are designed to engage the threaded end of an axle-spindle when the device is in operation, as presently described. The angular branch C of the main bar A is forked or bifurcated at its lower end, as at b, and formed at an intermediate point in said branch, is the transverse aperture c, which is preferably of a rectangular form in cross-section and is designed in practice to receive the shank of a nut-wrench F, which may be of the ordinary or any preferred construction and may be detachably secured in the branch C of the bar A in any approved manner.

In operation the wrench F is seated upon the wheel-nut, and the operator, holding the outer end of the slide-bar D with one hand, turns the main bar A about the slide-bar and removes the nut. After the nut has been removed from the axle-spindle the nut-wrench is preferably removed from the implement, and the end of the main bar, carrying the branch C, is passed through the spokes of the wheel, so that the bifurcated end of the said branch C will engage and rest upon the axle. The slide-bar D is then moved in toward the wheel until the inner end thereof engages the threads of the axle-spindle when the wheel is slid off the spindle and onto the inner end of said slide-bar.

By the provision of an implement such as described it will be seen that a wheel may be readily removed from its spindle, supported in its upright position, and as readily replaced upon the spindle after the latter has been greased.

Having thus described our invention, what we claim, and desire to secure by Letters Patent, is—

The improved implement described, comprising the main bar, the branch formed at one end of said bar and having a guide-eye, the branch formed at the opposite end of the main bar and having its end bifurcated, there being a longitudinally-disposed aperture of rectangular form in cross-section formed in the said branch and adapted to receive the shank of a wrench, the slide-bar taking through the guide-eye in one of the branches of the main bar, and the hanger branch fixedly connected to the slide-bar and having an eye to receive the main bar, substantially as specified.

In testimony whereof we affix our signatures in presence of two witnesses.

WILLIAM S. OVERFELT.
JOHN R. EVANS.
CHARLES J. CAPP.

Witnesses:
J. F. WALKER,
F. WEDDING.